United States Patent [19]
Fielding et al.

[11] 3,865,333
[45] Feb. 11, 1975

[54] QUICK RELEASE OPEN LINK

[75] Inventors: Lawrence E. Fielding, Dayton; Patrick J. O'Brien, West Carrollton, both of Ohio

[73] Assignee: The United States of America as represented by the Secretary of the Air Force, Washington, D.C.

[22] Filed: Oct. 5, 1973

[21] Appl. No.: 404,060

[52] U.S. Cl. .... 244/151 B, 24/201 LP, 24/230 AN, 244/137 R, 294/83 AA
[51] Int. Cl............................................ B64d 17/38
[58] Field of Search ........ 244/151 B, 151 R, 137 R, 244/151 A; 294/83 A, 83 AA; 24/201 LP, 230 AL, 230 AN

[56] References Cited
UNITED STATES PATENTS

| | | | |
|---|---|---|---|
| 3,257,089 | 6/1966 | Samms | 244/151 R |
| 3,670,999 | 6/1972 | Leger | 244/137 R |

Primary Examiner—George E. A. Halvosa
Assistant Examiner—Barry L. Kelmachter
Attorney, Agent, or Firm—Harry A. Herbert, Jr.; Arthur R. Parker

[57] ABSTRACT

A parachute extraction system-open link-safety device rigged to a cargo load to be airdropped and including a recovery parachute line-attached link and pin, a second, extraction parachute line-attached link and pin nestled in a resilient and quick release relation to the first-named link, a locking pin slidably disposed in the second-named link pin in a first, normally open-link position to allow separation of the links in the event of a malfunction stopping the complete extraction of the cargo load and thereby preventing the premature deployment of the extraction system-recovery parachute, and mechanical actuator means interconnected with, and automatically operative to move the locking pin to a second, locking position thereby internally positively connecting the two links and thus providing deployment of the recovery parachute on extraction of the load.

6 Claims, 16 Drawing Figures

QUICK RELEASE OPEN LINK

BACKGROUND OF THE INVENTION

This invention relates to a parachute extraction system for airdropping heavy equipment and other cargo from a cargo aircarft and in which an open link-safety device is used between the extraction and recovery parachutes thereof to prevent the premature deployment of the recovery parachute while the cargo is still in the aircraft.

Under normal airdrop conditions, the drag force created by the inflation of one or more extraction parachutes deployed behind the aircraft is used both to extract cargo therefrom and to deploy a recovery parachute to which is suspended the extracted load. In general, a force transfer mechanism is used to automatically transfer the extraction drag force from the load to the deployment line for the recovery parachute. Initially, however, to perform its first function of extraction, the extraction line is attached to the cargo by, in a relatively simplified form thereof, a short flexible link. At a predtermined time, based on design conditions for the particular application, the said line is severed and the remaining drag force of the extraction parachute is thereafter applied to the deployment line to deploy the recovery parachute, as the cargo is being completely extracted from the aircraft.

One problem involved in the above procedure is in the premature deployment of the recovery parachute while the cargo is still inside the aircraft. To eliminate this problem, an open link-safety device has long been used in airdrop tests. Past experience previously led to the currently used Koch device, manufactured by H. Koch and Sons of Corte Madera, Calif. and which consists of two major subassemblies; namely, a locking subassembly that is attached to the recovery parachute with a section of the deployment line thereof and the insertion subassembly, attached to a connector link on the extraction line also with a section of the deployment line. Normally, the above two subassembiles are connected together simply by means of a soft shear pin having a minimal shear strength of only about 200 pounds. The locking subassembly is, however, restrained to the cargo platform under a resistance force of approximately 2000 pounds.

With use of the above-noted Koch open link safety device, when the drag force of the extraction parachute has increased sufficiently, cargo mounted on platforms, in turn, positioned on aircraft siderails will be moved in an aft direction. After so moving a predetermined distance aft, a safety device lanyard is actuated by a stop on the aircraft static line anchor cable, at which point a trigger on the safety device is operated to lock the safety device and the extraction and deployment lines respectively attached thereto. Then, as the cargo-carrying platform leaves the aircraft, the continued drag of the inflating extraction parachute is automatically effective to deploy the recovery parachute throught the force transfer mechanism, the now-locked safety device and the deployment line.

When an emergency occurs, such as the premature cuttng away of the extraction line with its inflated extraction parachute or when it has to be severed in the event the aircraft siderail pressure locks, on which the cargo is mounted and attached, fail to release, then, the above-described Koch device prevents the deployment of the recovery parachute, since the platform has not moved the predetermined distance and therefore the two subassemblies thereof have not been positively locked. This leaves only the soft shear pin of predetermined mimimum shear force resistance and since the device has remained in its open link position, the 200 pound soft shear pin is rather easily sheared by the extraction parachute drag force, permitting the insertion subassembly to be pulled away together with the extraction parachute and line for their exit from the aircraft. The locking subassembly remains tied to the cargo by its 1000 pound restraint and, of course the recovery parachute remains undeployed In a second, more recent development, described and claimed in U.S. Pat. No. 3,670,999, the force transfer mechanism thereof incorporates a built-in open link device consisting basically of a crank arm that is mounted on the cargo load and which is automatically actuated by a fixture mounted on the aft portion of the aircraft cargo compartment-floor. When normal extraction occurs, the said crank arm automatically engages with the floor fixture and is thereby tripped to positively interlock the extraction parachute line to the recovery parachute-deployment line. However, if a malfunction should result, as when a floor latch to the cargo-carrying platform fails to release, thereby preventing the furhter aft movement of the cargo, the said crank arm naturally never reaches the aft position of the floor fixture, and is therefore not released and the link attaching the parachute and extraction link remains in the open position. In the latter event, the U.S. Pat. No. 3,670,999 mechanism utilizes a soleniod that is manually operated to release the extraction parachute. On the other hand, the new and novel open link-safety device of the present invention accomplishes the same objectives of both ensuring the separating of the recovery and extraction parachutes and allowing the extraction parachute and its interconnecting line to exit from the aircraft by an improved and yet simplified means to become readily apparent hereinafter from the following summary and detailed description thereof.

SUMMARY OF THE INVENTION

The present invention consists of an open link-safety device that may be rigged to the airdrop load to be extracted from a cargo aircraft by a parachute extraction system and which includes, in effect, a break-away link system that incorporates a first, recovery parachute line link, hereinafter to be referred to as the parachute link, and a second extraction parachute line link, hereinafter referred to as the extraction link, which is normally arranged in an open link or quick releasable relation with said parachute link by means and for a specific purpose to be hereinafter described in detail. The aforementioned first, parachute link consists of a pair of spaced-apart and parallel side link portions interconnected nearly adjacent one end thereof by means of a first, cylindrically-shaped, parachute link pin that extends transversely therebetween and around which may be attached one end of the recovery parachute deployment line or lines to the recovery parachute or parachutes attached to the cargo to be airdropped. The second, extraction link is nestled within the portion of said first, parachute link remote from the parachute link pin and is quick-releasably mounted thereto. It similarily incorporates a pair of spaced-apart side plate portions interconnected by a second, cylindrical extraction link pin that is spaced-apart from the parachute link pin and is used for attachment to one end of the extraction line or lines of an extraction parachute(s). Said extraction link pin is normally releasably retained in the aforementioned nestled relation within one end portion of the parachute link, as noted hereinbefore, by resilient, and easily and therefore quick releasable means that provides an interconnection between the two links of only a predetermined minimum force that may be rather easily overcomed by a minimal separation force to thereby completely separate the two links and thus allow the extraction parachute and line to exit from the aircraft without causing either the permature deployment of the recovery parachute or the further undesirable application of the continued drag force being exerted by the inflating extraction parachute to the cargo load that has, for example, been jammed on its supporting rails or to the aircraft.

The extraction parachute link pin incorporates a longitudinal passage or recess that is open at both ends and within may be slidably positioned a uniquely-operated, extraction link locking pin. The latter is normally disposed in the said link pin-passage or recess in a neutral, non-locking or open link position, leaving, at this time, the only interconnection or attachment between the parahcute and extraction links the previously-mentioned quick-releasable means. In this connection, it is noted that the extraction and parachute links and link pins of the present invention and the above-mentioned locking pin collectively apppear quite similar, if not identical, to the links 49 and 50 and locking pin 51 of the previously-referred to Pat. No. 3,6790,999. However, the means of the present device for actuating the locking pin thereof to its closed link position, to be further described hereinafter in detail, is considered to be generally much less complex than that of the aforementioned patent and, in particular, to involve a rather simplified and more reliable operating means that is believed obviously quite improved thereover.

The above-noted improvement of the instant invention resides in an entirely mechanical operating means for the locking pin of the subject device which comprises a plug element that is releasably and slidably mounted in one side of the recovery parachute link in contact between one end of the locking pin and a cap member that is releasably held, in its normal position, in a cap holder member that is rigidly attached to the same side of the recovery parachute link and which incorporates an open recess within which is positioned the said cap member.

The plug element further incorporates an arcuate-shaped side surface that is held in contact with a cam-shaped inner surface formed on the inner side of the cap member in contact therewith. A static line attachment cable connects the cap member to an anchor cable mounted in the aircraft-cargo compartment.

Where a malfunction occurs that prevents the complete extraction of a selected cargo load, the static line never reaches the stop on the anchor cable and, accordingly, fails to perform its normal function, thus leaving the previously-described locking pin in its neutral, open link position in the extraction link pin. The further application of the drag force being thereafter exerted by the extraction parachute automatically and rather easily acts to separate the extraction link from the parachute link against only the minimum resistance of the quick-release interconnection means existing therebetween. Therefore, no significant force is applied to the deployment line attached to the parachute link and thus the recovery parachute remains undeployed.

Where a proper extraction proceeds, one end of the previously-noted static line reaches the stop element on the anchor cable and, through the static line attachment cable, the inventive cap member is automatically pulled out of the mounting recess provided therefore in the cap holder member and, through the camming action between the cam-shaped inner surface thereof and the arcuate-shaped side surface of the plug element, the latter is cammed, or in other words, moved to one side in its opening in the appropriate side of the parachute link to thereby automatically and simultaneously move and/or reposition the locking pin in contact therewith to one side out of its normally neutral and open link position to a closed link position between and positively interconnecting the extraction and parachute links. Thereafter, the further drag force of the inflating extraction parachute is directly applied aganist the deployment line attached to the parachute link pin to thereby deploy the recovery parachute, after or as the particular cargo loaded is fully extracted from the aircraft.

Other objects and advantages of the present invention will become self-evident hereinbelow from the following disclosure, taken in connection with the accompanying drawings, in which:

BRIEF DESCRIPTION OF THE DRAWINGS

FIGS. 5 and 5a are top elevational and side views respectively depicting detials of the cap holder element of the invention; FIG. 6 is an overall view of the static line attachment cable used with the cap member of FIGS. 4 and 4a.

DESCRIPTION OF THE PREFERRED EMBODIMENT

Figure 1:
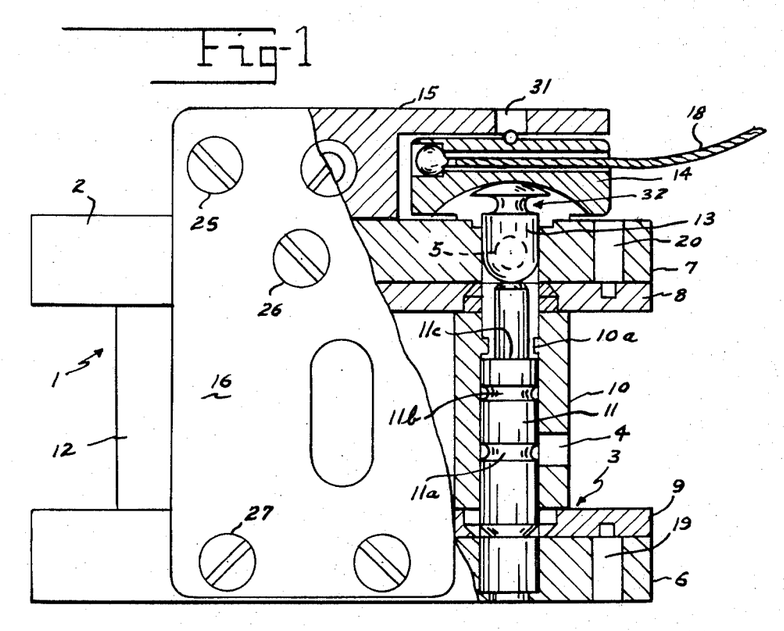
FIGS. 1, 1a and 1b respectively represent top, end, side and/or partly broken-away and sectioned views of the overall assembly of the invention.
Figure 1A:
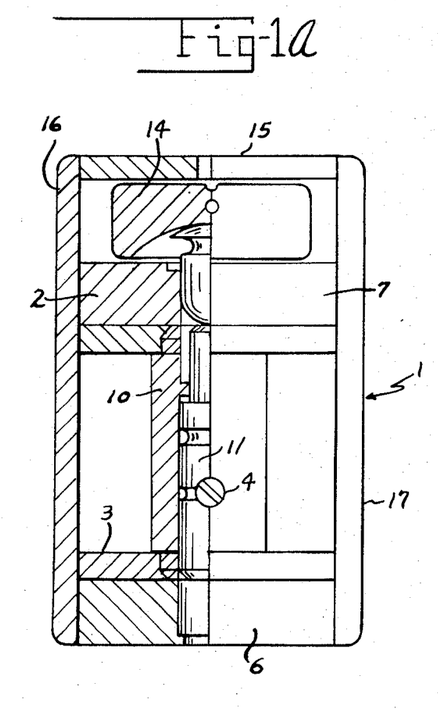
Figure 1B:
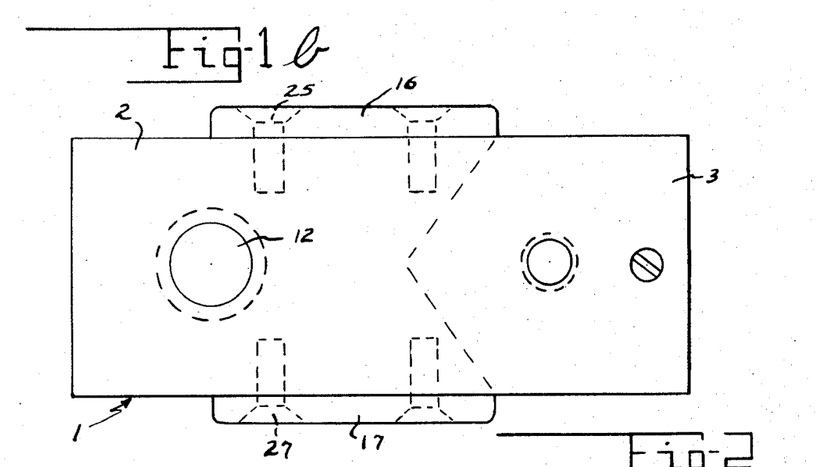

Referring generally to the drawings and, in particular, to FIGS. 1, 1a and 1b, the new and improved open link-safety device of the present invention is indicated generally at 1 as principally comprising a first, recovery parachute line link and link pin, indicatd respectively at 2 and 12, and a second, extraction parachute line link and link pin, at 3 and 10, that is nestled within the end portion of said first-named link 2 remote from the link pin 12 thereof. It is noted that, when the inventive open link-safety device would be positioned in a parachute extraction system, it would be rigged to the cargo load to be extracted, and the appropriate end of the extraction line to the extraction parachute and that of the deployment line to the recovery parachute attached to the load would be respectively connected around the said extratction and recovery parachute link pins 10 and 12. In accordance with the unique teachings of the present invention, the said extraction parachute line link pin 10 incorporates a central recess or longitudinally-disposed and open-ended passage within which may be slidably positioned in a relatively snug-fit relation an extraction parachute line link locking pin, at 11, which, in the view of FIG. 1, is shown in its first, normally open-link and unlocking position. A ball plunger or detent, at 4, is used to respectively retain said locking pin 11 in either the said first, open-link position of FIG. 1 and/or in its second, locking position to be further described. For this purpose, the said detent 4 engages in a first or second groove formed respectively at 11a and 11b. In order that the locking pin 11 may be correctly and quickly positioned within the link pin 10 with its first groove 11a engaged by the ball detent 4, an interior flange is disposed at 10a in the said link pin 10 against which an appropriate abutment 11c of the locking pin 11 will engage when in its unlocking position of FIG. 1. In this regard, when locking pin 11 is in the said first, unlocking position, the second, extraction partchute line link 3 and link pin 10 are quick-releasably retained in the previosuly-referred to nestled relation in one end portion of the first, recovery parachute line link 2 solely by means of an oppositely-disposed pair of stubby spring plungers, as indicated schematically at 19 and 20 (FIG. 1).

Figure 2:
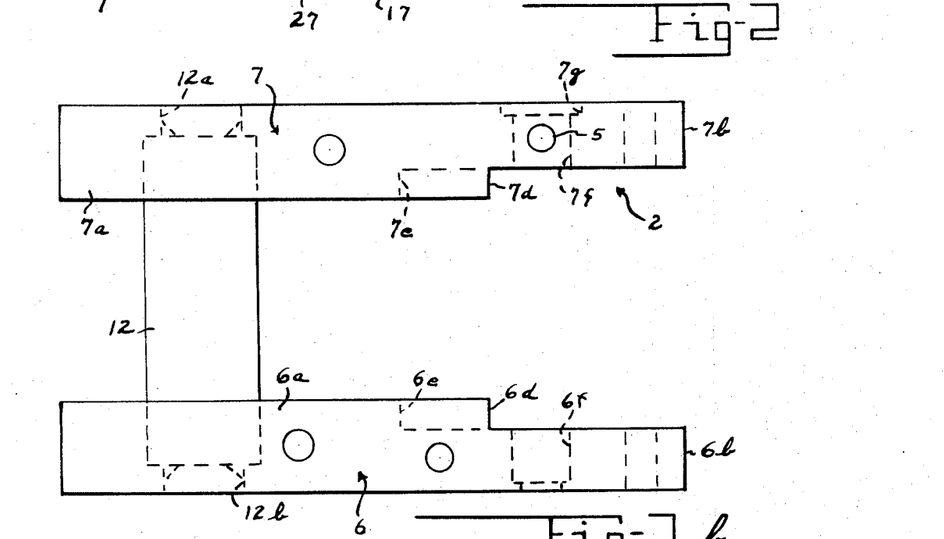
FIGS. 2, 2a and 2b and 3, 3a and 3b respectively illustrate top, end and side views of the recovery, and extraction parachute link subassemblies of the present invention.
Figure 2A:
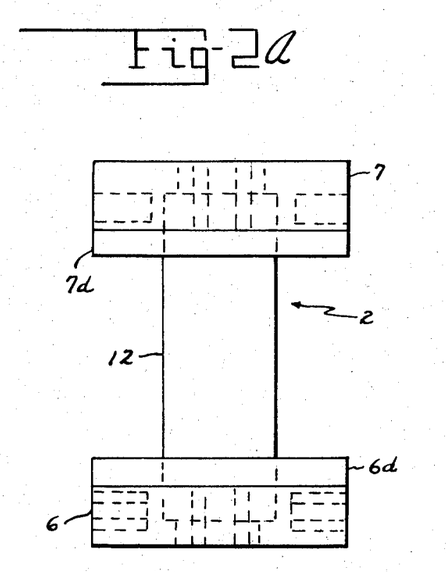
Figure 2B:
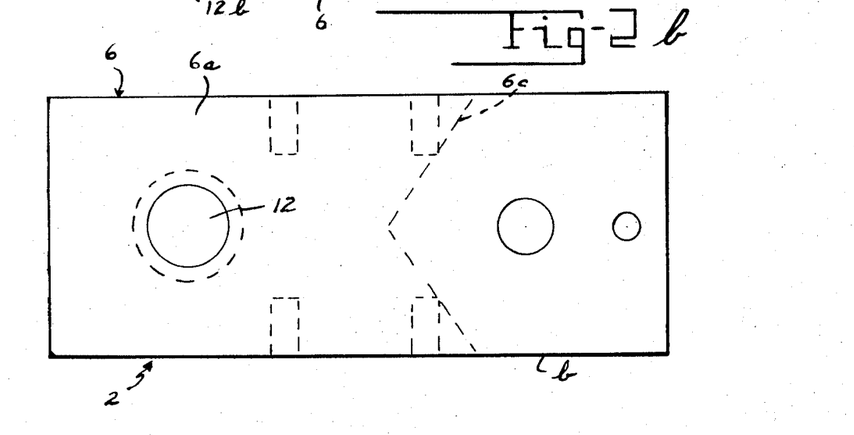

With the aforementioned quick-release interconnection afforded by the said spring plungers 19, 20 between the recovery and extraction parachute line links 2 and 10 and with the locking pin 11 initially in the first, open link position of the aforementioned FIG. 1, as the load is extracted from the cargo aircraft, a unique locking pin-operating means, to be further described hereinafter in detail, becomes automatically effective to reposition the said locking pin 11 into a second position interconnecting and thereby positively locking together the recovery and extraction parachute links 2 and 3, and, of course, the respective link pins 12 and 10 thereof, and thus uniquely providing a continuous connection between the extraction parachute line and the recovery parachute deployment line. Simultaneously therewith, force transfer would occur in a conventional and already-well known manner to deploy the recovery parachute(s). On the other hand, should a malfunction occur and force transfer is accomplished before the load has actually exited from the aircraft, the aforementioned novel locking pin-operating means would remain in the open-link position of FIG. 1 and, since this means that the link is not internally connected, the extraction parachute line link 3 and its pin 10 would automatically separate, against only the relatively minimum restraint being imposed thereagainst by the action of the spring plungers 19 and 20, and the extraction line would exit the aricraft. Of course, since at this point, no continuous connection would exist between the extraction parachute line and recovery parachute deployment line, the recovery parachute would remain undeployed.

with particular reference to FIGS. 2, 2a and 2b, it is clearly seen that the previously-described recovery parachute line link 2 actually constitutes an overall assembly that consists in a pair of relatively elongated, oppositely-disposed and parallel link-sides, at 6 and 7, that are held in a predetermined spaced-apart and parallel relation to each other by the aforementioned link pin 12 which extends in transverse relation and nearly adjacent to one end of each link-side 6, 7. To provide a rigid interconnection therebetween, the opposite end portions of said link pin 12 contains a reduced-diameter section, at 12a and 12b, that may be welded or otherwise affixed in a suitably configured opening corresponding thereto in each of the said line-sides 6, 7. Of course, one end of the deployment line(s) (not shown) to a recovery parachute(s) to which the cargo loaded being extracted may be suspended may be attached around the said pin 12. Each of the said parachute link-sides 6, 7 may be specifically and uniquely designed with a relatively wide side portion, as at 6a and 7a, and a relatively narrrow side portion, as at 6b and 7b, for a specific purpose to be further explained. A relatively enlarged, V-shaped groove or notch, as at 6c in FIG. 2b, may be cut or otherwise formed in each of the relatively wide, parachute link-side portions 6a and 7a beginning at the juncture 6d, 7d thereof with the relatively narrow side portions 6b and 7b and extending into the said relatively wide side portions 6a, 7a to terminate at the position marked respectively at 6e and 7e (Note FIG. 2, for example). With the foregoing arrangement, the second, extraction link 3 may be precisely accommodated in the previously-described nestled relation within the first, parachute link 2 in the improved manner to be described hereinafter.

Again referring to FIGS. 2, 2a and 2b, the parachute link-sides 6, 7 respectively incorporate aligned openings in the side portions 6b, 7b at 6f and 7f. Opening 7f is for receiving and slidably supporting in snug-fit relation therewithin a parachute link pin-plug element, indicated at 13 in FIG. 1 and whose function and operation will be described in specific connention with the previously-noted operating means for the locking pin 11. On the other hand, the opening 6f is to provide an appropriate space in the parachute link-side portion 6b to receive therewithin one end of the said locking pin 11, as the latter is moved between its open and closed-link positions by the previously-mentioned operating means therefor. In specific connection with the said plug element 13, a pair of spring plunger or ball detent elements may be located, as is indicated generally and schematically at 5 for one of them, and extend in opposed relation through both the top and bottom of the parachute link-side 7 for resilient contact against opposite sides of the plug element 13. In this manner, when said plug element 13 is moved during the repositioning of the locking pin 11 to its second position as will be described hereinafter, the ball detents, as at 5, will engage in the arcuate space, indicated generally at 32 (FIG. 1) between appropriate portions of the said plug element 13 and thereby ensuring the capture of the latter during the operation of the invention.

Figure 3:
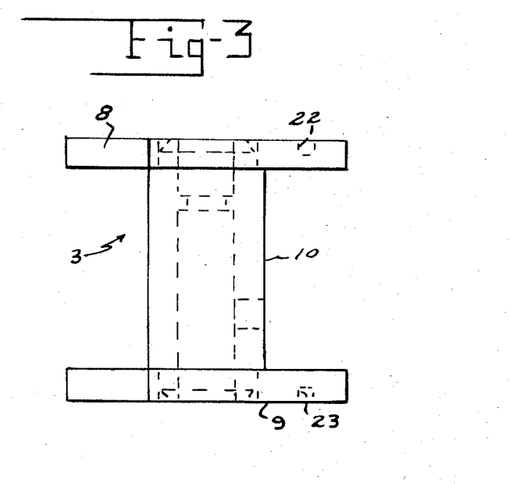
Figure 3A:
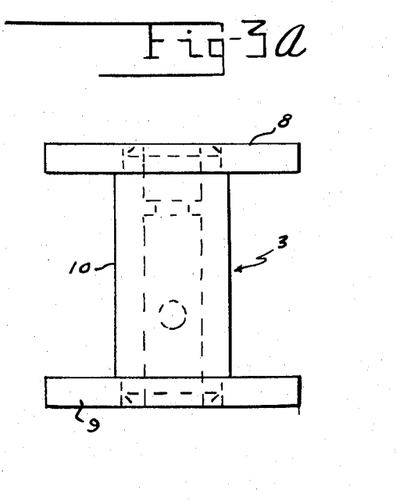
Figure 3B:
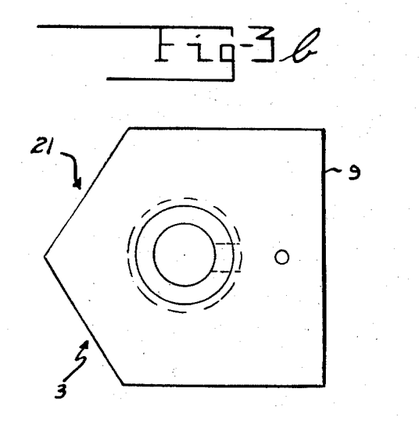

Referring specifically to FIGS. 3, 3a and 3b, the extraction link 3 is also actually seen as consisting of a separate subassembly that comprises a pair of parallel extraction line link side-plates at 8 and 9 that are retained in an appropriate spaced-apart relation by means of the previously-mentioned extraction line link pin 10 in the aforementioned nestled relation relative to the parachute link 2 in respective contact with the parachute link-sides 7 and 6. For this purpose, the extraction link pin 10 incorporates reduced diameter-opposite ends that engage in and are rigidly attached, as by welding, to suitable openings respectively provided therefor in the plates 8, 9 (Note FIG. 1). The latter are actually assembled in respective contact within the relatively narrow side portions 7b, 6b of the parachute link-sides 7, 6 and with the inside surfaces thereof in flush relation to that of the relatively wide side portions 7a, 6a of the said link-sides.

To specifically provide for a more positive accommodation between the parachute and extraction links 2 and 3, the extraction link-side plates 8 and 9 of the latter are each formed with a projecting V-shaped inner end, as is indicated generally at 21 in FIG. 3b, each of which is disposed and meshed in a snug-fit and mating relation in the previously-described V-shaped groove 6c that was noted hereinbefore as having been cut or otherwise formed in each of the relatively wide, parachute link-side portions 6a and 7a (Note FIG. 2b). To further provide for a quick releasable attachment between the parachute and extraction links 2 and 3, the extraction link side plates 8 and 9 respectively further incorporate relatively small recesses, as at 22 and 23 (FIG. 3), in their ends remote from the previously-described V-shaped ends thereof, as at 21 (FIG. 3b), within which recesses 22, 23 may be respectively resiliently engage the previously-noted stubby spring plungers 19 and 20 corresponding thereto, and mounted in the appropriate location of the parachute link-sides 6 and 7. These resilient quick-releasable, spring plungers 19 and 20 constitute the only attachment existing betweeen parachute and extraction links, when the previously-mentioned locking pin 11 is in its open link and unlocking position of FIG. 1. In the event of a malfunction occurring during the extraction process, as when the particular cargo load being extracted is prevented from completing its aft movement out of the aircraft, the continued drag force being exerted by the extraction parachute(s) through the extraction line(s) that would be attached to the extraction link pin 10 would quickly overcome the relatively small hold force being normally and solely exerted by the aforesaid resilient spring plungers 19 and 20, and thus allow the said link pin 10 to automatically separate from the parachute link 2 to thereby release the extraction parachute(s) and line(s) from the aircraft with the recovery parachute(s) remaining undeployed.

Figure 4:
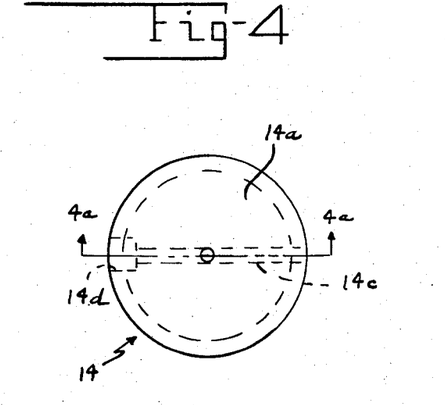
FIG. 4 is a side view of the cap member used as part of the novel open link-locking pin-actuating means of this invention.
Figure 4A:
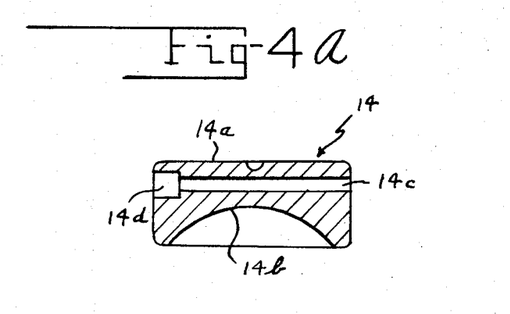
FIG. 4a is a cross-sectional view, taken about on line 4a—4a of FIG. 4 and showing additional details of the locking pin-actuating means-cap member.

When a correct extraction of a selected cargo load has occurred, i.e., when there is no malfunction, the continued drag force being exerted by the inflating extraction parachute(s) is automatically directly applied to the recovery parachute(s) and recovery parachute line(s), which, as was previously described, would be attached, at one end thereof, around the parachute link pin 12 (Note FIG. 1). This action would result from the simultaneous repositionng of the extraction locking pin 11 to its closed position through the automatic operation of another novel and yet simplified means of the present invention; namely, by the actuation of the locking pin-operating means, previously mentioned hereinabove. Said locking pin-operating means includes, in addition to the already-mentioned parachute link-plug element 13, a unique cap element that is indicated generally at 14 in FIG. 1 and more clearly in FIGS. 4 and 4a. As illustrated in the latter figures, said cap element 14 is generally cylindrical or of a circular plan form having a first, flat outer side 14a and a second, arcutate-shaped, cam surface-inner side 14b for a unique purpose to be further described. The cap element 14 further incorporates an elongated and centrally-disposed, open-ended passage 14c that extends through a convenient diameter thereof and within which is positioned one end portion of a static line attachment cable 18 (See FIG. 1), the other end of the static line to the said attachment cable 18 being slidably attached to an anchor line cable mounted within the aircraft cargo compartment. For providing a positive hold between the cap element 14 and the attachment cable 18, one end of the latter would incorporate a relatively enlarged knob-like element 18a, as is depicted more clearly in FIG. 6, that, after the said attachment cable 18 is threaded through the central passage 14c of the cap element 14, would engage and be retained in an enlarged recess 14d (FIG. 4a) formed in the apporpriate end of the passage 14c. Thereafter, an eye loop, as at 24, would be fabricated on the opposite end of the attachment cable 18. It is to this eye loop 24 that one end of the static cable (not shown) would be attached.

Figures 5, 5A, 6:
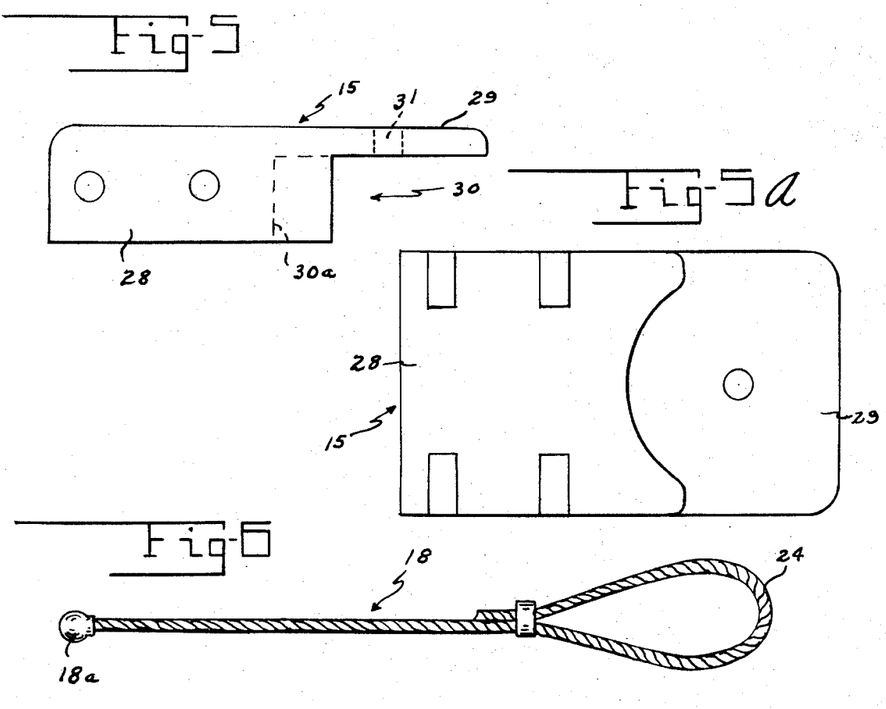

To positively and yet releasably retain the cap element 14 in its intially installed and preparatory position, a cap holder member, seen generally at the reference number 15 in FIGS. 5 and 5a as well as in FIG. 1, may be mounted to and on one side of the inventive link device 10 in contact with the parachute link side 7. To this end, top and bottom cover plates at 16 and 17 (Note FIGS. 1 and 1b) may be utilized both to rigidly hold the said cap holder member 15 in position, as well as to provide further and rigid support between the parachute link sides 6 and 7, through means of the use of appropriately-located and preferably countersunk screws, as at 25, 26 and 27 in FIG. 1. Said cap holder member 15 incorporates a relatively enlarged main supporting-body portion 28 that is rigidly mounted to the outer surface of the parachute link side 7 by means of the cover plates 16, 17 and a relatively narrow, projecting cap holder-portion 29 that is open at the outer end thereof and which defines an enlarged inner space, indicated generally at 30 in FIG. 5, for example, which space 30 is interposed between the projecting cap holder-portion 29 and the parachute link-side 7 and within which is relasably retained the cap element 14. The latter is, in fact, restrained in a quick-releasable contacting relation between the inside surface of the projecting portion 29 of the cap holder member 15 and the outside surface of the parachute link side 7 with the previously-described cam-shaped inner side 14b thereof (FIG. 4a) facing inwardly for a novel purpose to be further explained. To specifically provide for the aforesaid quick releasable feature thereof, a ball plunger element, indicated schematically and generally at 31 as being mounted in, and extending through the wall of the projecting portion 29 of the cap holder member 15, may resiliently engage in a suitable recess formed for this prupsoe in the outer surface of the cap element 14. Moreover, the recess 30 is formed with a circular inner surface at 30a (FIG. 5) for accommodating the circular configuration of the cap element 14 and is open on all three remaining sides thereof for uniquely providing, as taught by the present invention, for the relatively free removal of the said cap element 14 in almost all directions. This feature, of course, makes it possible for this invention to accommodate various sizes of cargo loads.

Figure 7:
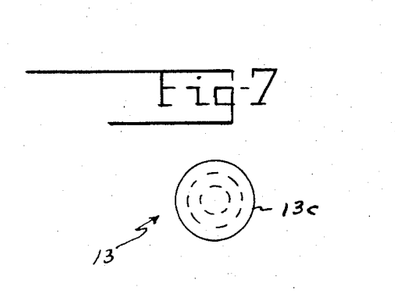
FIGS. 7 and 7a are top and side views respectively showing details of the unique recovery parachute link-mounted plug element forming an integral part of the unique locking pin-actuating means of the present invention.
Figure 7A:
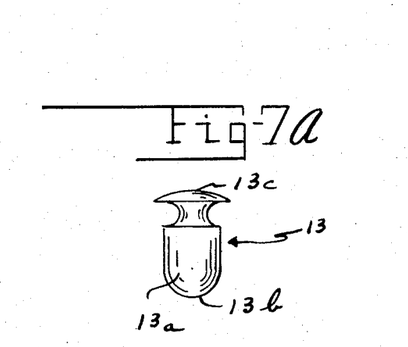

The parachute link-plug element 13, which is intermediately positioned in contacting relation between one end of the extraction link locking pin 11 and the cap element 14, as is depicted in FIG. 1, actually consists of a main plug portion, 13a, which, as is illustrated in FIG. 7, is of a generally cylindrical configuration and which, however, incorporates a circular side at 13b (See FIG. 7a), which is normally in frictional contact with one end of the locking pin 11 (FIG. 1), and an outer arcuate surface portion at 13c that is engaged against the cam-shaped, inner side 14b (FIG. 4a) of the cap element 14. With the above-described new, novel and yet simplified extraction line locking link-operating means, as the load to be extracted from the aricraft is moved in an aft direction by the inflating extraction parachute(s) and extraction lines(s) attached to the extraction link pin 10, the static line to which the attachment cable 18 would be attached would reach a conventional stop located on the anchor line cable in the aircraft-cargo compartment, at which time, the further movement aft of the cargo load would automatically result in the static line being drawn in a taut condition and this, in turn, would automatically cause the cap element 14 to be pulled out of its normally installed position of FIG. 1, within the recess or inner space 30 formed within the cap holder member 15. This action is automatically operative to close and lock the inventive link device 10, since the aforementioned pulling of the cap element 14 from its recessed position in the inventive link device 10 causes the cam-shaped, inner surface 14b of the cap element 14 in normal engagement with the arcuate-shaped side 13c of the plug element 13 to cam and thereby push the said plug element 13 and thus the locking link pin 11 to one side; i.e., to the right as viewed towards the direction of the extraction parachute(s), out of its normally link open position of FIG. 1 until its right hand end is thereby automatically cammed into the previously-described oepening 6f provided therefor and formed in the parachute link side 6. At this time, the arcuate-shaped outer surface portion 13c (FIG. 7a) has come to rest in, and its further movement stopped by an appropriately shaped and sized-recess 7g (FIG. 2) provided for this purpose around the end portion of the opening 7f formed in the recovery parachute link-side 7. Also, the previously mentioned ball detents, as at 5 (FIG. 2) now automatically engage in the arcuate space 32 (FIG. 1) formed for this purpose between the main plug portion 13a and the outer arcuate surface portion 13c to thereby positively capture and retain said plug element 13 in contact with the locking pin 11. This arrangement also further reinforces the action of the ball detent 4 to retain the locking pin 11 in its second, locking position. Thus, with the locking link pin 11 now being rigidly interconnected therebetween, the extraction link 3 is now positively attached to the parachute link 2 and a continuous connnection is now provided between the extraction parachute line(s) attached around the extraction link pin 10 and the recovery parachute line(s) attached around the recovery parachute link 12. Simultaneously with the closing and locking of the inventive link device 10, as described above, force transfer occurs in the normal manner, through a conventional force transfer mechanism and thus the continued drag force of the inflating extraction parachute(s) automatically applied directly to and thereby inflates the recovery parachute(s). Of course, as noted hereinbefore, should a malfunction occur and the force transfer step is accomplished before the load is fully extracted from the aircraft, the deployment line(s) cannot deploy the recovery parachute(s) for the reason that the inventive link device 10 and, in particular, the locking pin 11 thereof remains in its open and unlocked position, is therefore not internally connected, and the extraction link 3 will automatically separate from the parachute link 2 and allow the extraction line(s) per se, as well as the extraction parachute(s) to exit from the aircraft without any further drag force being applied to the aircraft.

Thus, a new and improved open link-safely device based entirely on mechanical action to ensure both simplicity and reliability has been developed by the present invention for use with conventional parachute extraction systems whereby the premature deployment of the recovery parachute(s) is prevented.

We claim:

1. In a parachute extraction system for airdropping heavy equipment and other cargo loads, an open link-safety rigged to the cargo load to be extracted and comprising; a first, recovery parachute link and first link pin for attachment to the deployment line of a recovery parachute mountable to the top of the cargo load to be extracted; a second, extraction parachute link and second link pin to which one end of the extraction line of an extraction parachute may be attached disposed in nestled relation within the end of said first-named link remote from the said recovery prachute link pin; quick-release means normally providing the sole interconnection and attachment between said first and second links; an extraction link-mounted link-locking means initially disposed in a first, link-open position relative to said second, extraction link pin and selectively adjustable to a second, link-closed position; and mechanically-actuated, link-locking-operating means interconnected with, and automatically moving from a first, inoperative position to a second, operative position to thereby adjust the said link-locking means to the said second, link-closed postiion thereof upon a predetermined movement in an aft direction of the cargo being extracted to thus rigidly interconnect said first and second links and the respective recovery and extraction parachute line-attached link pins thereof to thereby deploy the recovery parachute; said link-locking-operating means remaining in its first, inoperative position when a malfunction has occurred prohibiting the said predetermined aft movment of said cargo; said extraction link-locking means comprising a relatively elongated, locking pin adjustably positioned in slidable relation within a longituidnally disposed passage of said second-named link pin; said mechanically-actuated link-locking-operating means comprising a static line attachment cable adapted to be interconnected with one end of a static line slidably attached at its other end to an anchor cable and automatically operative to adjust said locking pin to its econd, closed-link position when said static line is pulled taut on reaching a stop on the said anchor cable.

2. In a parachute extraction system as in claim 1, wherein said mechanically-actuated, link-locking-operating means further comprises a cam-shaped element connected to said attachment cable and normally positioned in an open-ended recess and in indirect operating contact with one end of said locking pin; said attachment cable being operative by said static line to thereby automatically remove and thus automatically cause the cam-shaped element to cam against and reposition said locking pin to its second, closed-link position.

3. In a parachute extraction system as in claim 2, wherein said mechanically-actuated, link-locking-operating means still further comprises an intermediately-disposed, plug element slidably positioned in a communicating opening between one end of said locking pin and said open-ended recess, and incorporating a first, surface in direct contact with said one end of the locking pin and a second, arcuate surface in direct contact with said cam-shaped element.

4. In a parachute extraction system as in claim 3, wherein said cam-shaped element comprises a cap-like member having an inner cam surface portion contacting the second, arcute-shaped surface of said plug element.

5. In a parachute extraction system as in claim 4, wherein said cap-like member is held in positive contact with said plug element by a cap holder element mounted to one side of said first, recovery parachute link.

6. In a parachute extraction system as in claim 5, wherein said cap holder element incorporates a relatively narrow projecting portion spaced from one side of said recovery link and forming the said open-ended recess therebetween in which the said cap-like member is releasably positioned.

* * * * *